United States Patent
Dutta et al.

(10) Patent No.: US 7,509,372 B2
(45) Date of Patent: Mar. 24, 2009

(54) METHOD AND SYSTEM FOR REDIRECTING DATA REQUESTS IN PEER-TO-PEER DATA NETWORKS

(75) Inventors: Rabindranath Dutta, Austin, TX (US); Janani Janakiraman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1123 days.

(21) Appl. No.: 09/951,952

(22) Filed: Sep. 13, 2001

(65) Prior Publication Data

US 2003/0050966 A1 Mar. 13, 2003

(51) Int. Cl.
G06F 15/16 (2006.01)

(52) U.S. Cl. ........................................ 709/203; 709/231

(58) Field of Classification Search ................ 709/203, 709/201, 206, 228, 229, 231; 707/3, 10
See application file for complete search history.

(56) References Cited

U.S. PATENT DOCUMENTS

| | | | | |
|---|---|---|---|---|
| 5,511,208 A | | 4/1996 | Boyles et al. ............... | 395/800 |
| 5,684,985 A | * | 11/1997 | Ahmadi ...................... | 707/100 |
| 5,884,028 A | | 3/1999 | Kindell et al. ......... | 395/200.23 |
| 6,098,091 A | | 8/2000 | Kisor ......................... | 709/202 |
| 6,115,713 A | | 9/2000 | Pascucci et al. ............... | 707/10 |
| 6,427,165 B1 | * | 7/2002 | Anderson .................... | 709/217 |
| 7,072,982 B2 | * | 7/2006 | Teodosiu et al. ............ | 709/245 |
| 7,200,667 B2 | * | 4/2007 | Teodosiu et al. ............ | 709/229 |
| 7,272,645 B2 | * | 9/2007 | Chang et al. ................ | 709/223 |
| 2002/0055972 A1 | * | 5/2002 | Weinman, Jr. .............. | 709/203 |
| 2002/0062375 A1 | * | 5/2002 | Teodosiu et al. ............ | 709/226 |
| 2002/0087797 A1 | * | 7/2002 | Adrangi ...................... | 711/133 |

OTHER PUBLICATIONS

"Gnutella Support" from www.gnutella.wego.com (as cited in IDS).*
"Gnutella Support" from gnutella.wego.com Dec. 31, 1999 (as cited in sbumitted IDS).*
"Gnutella Support" from gnutella.wego.com Dec. 31, 1999 (as cited in submitted IDS).*
Hibbard, "Can peer-to-peer grow up?", Red Herring, Dec. 4, 2000.

(Continued)

Primary Examiner—John Follansbee
Assistant Examiner—Dhairya A Patel
(74) Attorney, Agent, or Firm—Hamilton & Terrile, LLP; Stephen A. Terrile

(57) ABSTRACT

A methodology for operating a data sharing application in a peer-to-peer network is presented. After a first peer node receives a request for a copy of a specified file from a second peer node, the first peer node may either return a copy of the specified file or a response message containing an alternate node list associated with the specified file. The alternate node list contains a set of node identifiers indicating a set of alternate peer nodes within the peer-to-peer network that may have a copy of the specified file. The alternate node list is dynamically maintained at each peer node. The response provided by the first peer node, i.e. either a copy of the specified file or the alternate node list, can be determined based on an operational condition of the first peer node, e.g., whether or not the first peer node is experiencing an overload condition.

1 Claim, 7 Drawing Sheets

OTHER PUBLICATIONS

Heltzel, "Search In Progress", *Business 2.0*, Sep. 12, 2000.
"The Gnutella Protocol", http://gnutella.wego.com, Jul. 2, 2000.
"Gnutella Support", http://gnutella.wego.com, Dec. 31, 1999.
"Cap'n Bry's gnutella search", http://capnbry.dyndns.org/gnutella/protocol.php, no date giv n.

* cited by examiner

METHOD AND SYSTEM FOR REDIRECTING DATA REQUESTS IN PEER-TO-PEER DATA NETWORKS

BACKGROUND OF THE INVENTION

1. Field of the Invention

The present invention relates to an improved data processing system and, in particular, to a method and system for multicomputer data transferring. Still more particularly, the present invention provides a method and system for computer-to-computer session/connection establishing and computer-to-computer data transferring.

2. Description of Related Art

The amount of Internet content continues to grow rapidly and to outpace the ability of search engines to index the exploding amount of information. The largest search engines cannot keep up with the growth as it has been estimated that search engines only index about 5% to 30% of the information content on the Web. Hence, at the current time, the majority of Web content is not classified or indexed by any search engine.

There are currently two broad categories of systems which provide the service of categorizing and locating information on the Web: (1) search engines that return direct hits to sites containing data that match inputted queries, such as AltaVista; (2) Web portals that organize the information into categories and directories, such as Yahoo!. These systems operate using a traditional client-server model with packet-switched data interchange.

Recently, the traditional Web client-server paradigm has been challenged by distributed content-sharing or file-sharing systems that support a peer-to-peer model for exchanging data. In peer-to-peer networks, each computer platform, or node, can operate as a hub, i.e., each node has both client functionality and server functionality. A peer-to-peer network is a logical organization of associated nodes within a larger network of nodes, such as the Internet. Each node in the peer-to-peer network has a list of addresses, most commonly Internet Protocol (IP) addresses, of several other computers within the larger network that are also functioning as peer nodes within the peer-to-peer network. The peer nodes can directly communicate with each other without a central or intermediate server. Typically, each peer node maintains a list of files that it is willing to share with other peer nodes.

Nodes within a peer-to-peer network form a distributed file-sharing system in which the nodes act cooperatively to form a distributed search engine. When a user at a node enters a search query, a copy of the search query is sent to each node in its internal list of peer nodes. Each peer node that receives a search query searches its own databases in an attempt to satisfy the search query; each node also copies the query to each node in its internal list of peer nodes while observing a time-to-live value in the query message. If a resulting query hit is made at a particular node, then that node returns some type of query results to the node that originated the search query. The range of the search quickly fans out amongst a large number of nodes, thereby providing a useful manner for potentially finding new content.

In a peer-to-peer data sharing network, each node participates in a process of connecting and disconnecting with other nodes, and each node may have multiple incoming and outgoing connections that are uploading and/or downloading files. After displaying the query hits to a user of a peer-to-peer application, the user may request to download a file that has been reported as satisfying the search query. Typically, the peer-to-peer protocol provides for the exchange of information relating to the network connection speed of a node, and the user can view these connection speeds to determine from which node the user wants to download a desired file. If the user decides that a particular download is progressing too slowly, then the user can terminate the connection and attempt to download the desired file from another node that has returned a query hit for the file.

A major issue with respect to downloading files in a peer-to-peer network is the quality-of-service characteristics of the nodes in the peer-to-peer network. Given that a peer-to-peer network is inherently decentralized, the physical characteristics of the computers that support the nodes in the peer-to-peer network can vary greatly. A user of a peer-to-peer application has no guarantees with respect to response times, connection speeds, bandwidth usage, or other quality-of-service characteristics. Since the fan-out across an entire distributed peer-to-peer network can be quite large, a user may encounter a wide disparity in the response characteristics of the nodes to which the user's node connects during a peer-to-peer session.

Any peer node has only a limited number of connections that it can reasonably support at any given time. However, prior to requesting the download of a file from a particular node, a user does not have any information on the current load that is being experienced by the particular node. Although the user may know the connection speed of the node, which may lead the user to assume that the download time from the node will be inversely proportional to the connection speed of the node, the node may be experiencing a heavy load with many simultaneous connections. Hence, after requesting to download a file from the node, the user may discover that the download of the file proceeds more slowly than desired, presumably because the node is experiencing a heavier load than the user may deem appropriate.

Therefore, it would be advantageous to provide a method and system for improving response characteristics within a peer-to-peer data sharing network. It would be particularly advantageous to allow a node to indicate an alternate manner for fulfilling a download request if the node determines that its response characteristics would be inadequate if it attempted to fulfill a new download request.

SUMMARY OF THE INVENTION

A method, apparatus, system, and computer program product for operating a data sharing application in a peer-to-peer network is presented. Nodes within the peer-to-peer network can operate both in a client mode while requesting data and in a server mode while transmitting data. After a first peer node receives a request for a copy of a specified file from a second peer node, the first peer node may either return a copy of the specified file or a response message containing an alternate node list associated with the specified file. The alternate node list contains a set of node identifiers, e.g., IP (Internet Protocol) addresses, indicating a set of alternate peer nodes within the peer-to-peer network that may have a copy of the specified file. The alternate node list is dynamically maintained at each peer node. The response provided by the first peer node, i.e. either a copy of the specified file or the alternate node list, can be determined based on an operational condition of the first peer node, e.g., whether or not the first peer node is experiencing an overload condition.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

The present invention provides a method and system for improving response characteristics within a peer-to-peer data sharing network. As background, a typical organization of hardware and software components within a distributed data processing system is described prior to describing the present invention in more detail.

Figure 1A:
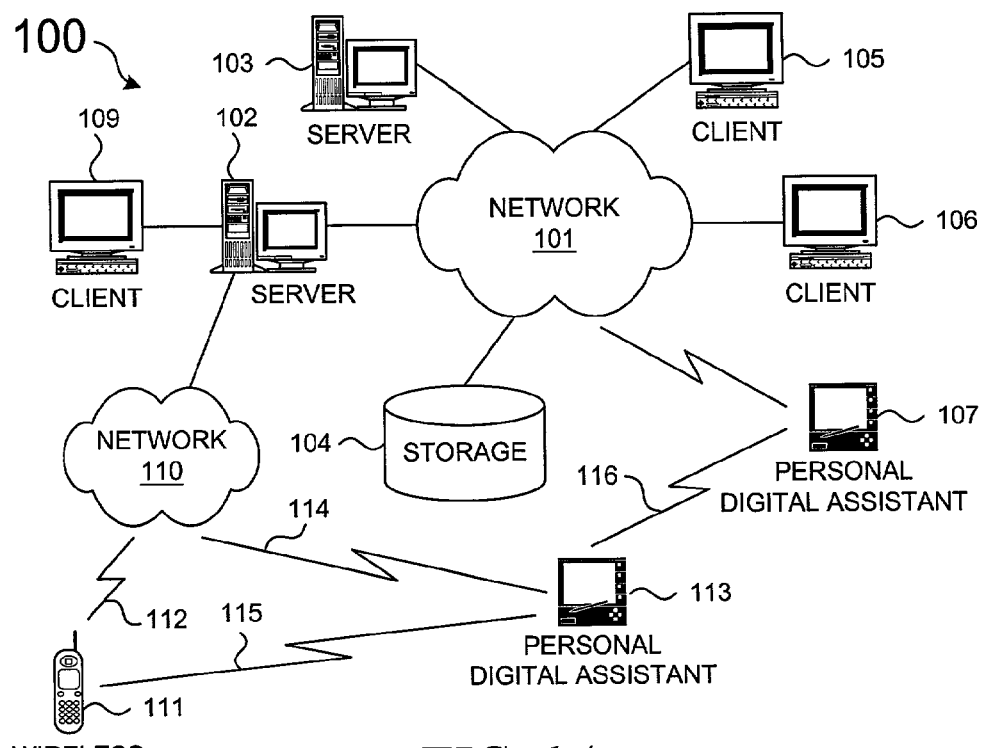
FIG. 1A depicts a typical distributed data processing system in which the present invention may be implemented.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 117 via wireless communication link 116.

The present invention could be implemented on a variety of hardware platforms; FIG. 1A is intended as an example of a heterogeneous computing environment and not as an architectural limitation for the present invention. It should be noted that the distributed data processing system shown in FIG. 1A is contemplated as being fully able to support a variety of peer-to-peer subnets and peer-to-peer services.

Figure 1B:
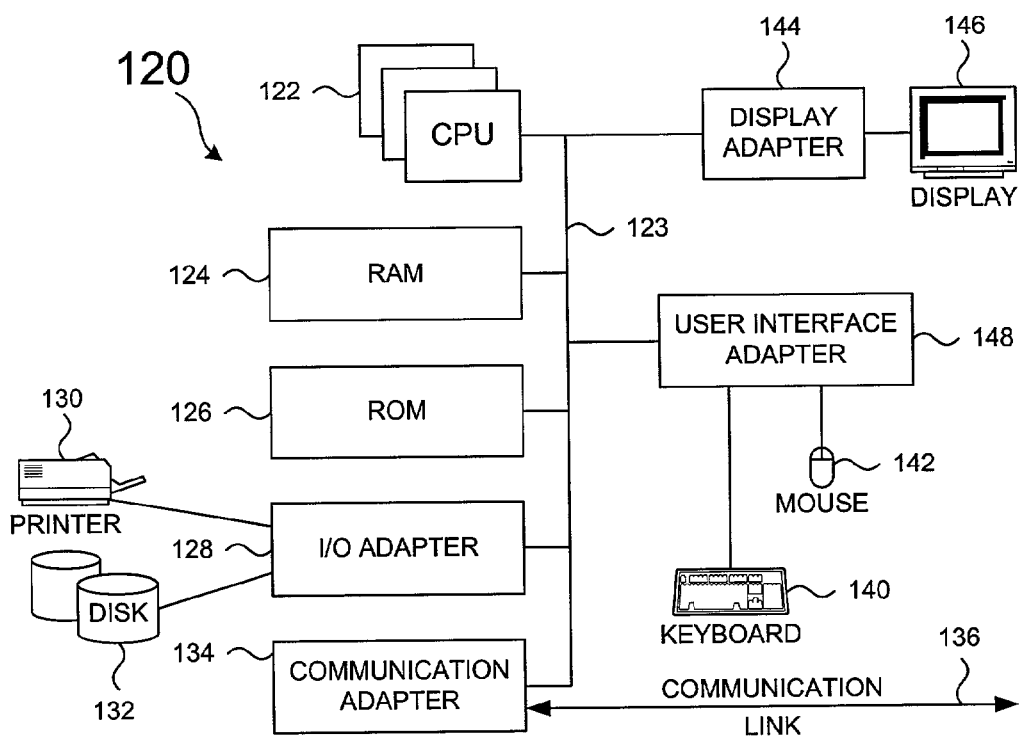
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. In other words, one of ordinary skill in the art would not expect to find similar components or architectures within a Web-enabled or network-enabled phone and a fully featured desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Linux® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above. More specifically, though, the present invention is directed to providing a method and system for accessing information on a network that includes peer-to-peer networks or subnets. As background, a typical organization of software components within a peer-to-peer network is described prior to describing the present invention in more detail.

Figure 2A:
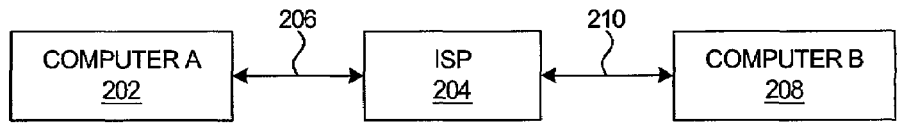
FIG. 2A is a block diagram that depicts a simplified, Internet-based connection between two computers.

With reference now to FIG. 2A, a block diagram depicts a simplified, Internet-based connection between two computers. Computer 202 communicates with ISP (Internet Service Provider) 204 across communication link 206, and computer 208 communicates with ISP 204 across communication link 210. Users of computers 202 and 208 can employ browsers and other networked applications, such as a peer-to-peer file sharing application, to send and receive information across a network, which includes the Internet in this example.

Figure 2B:
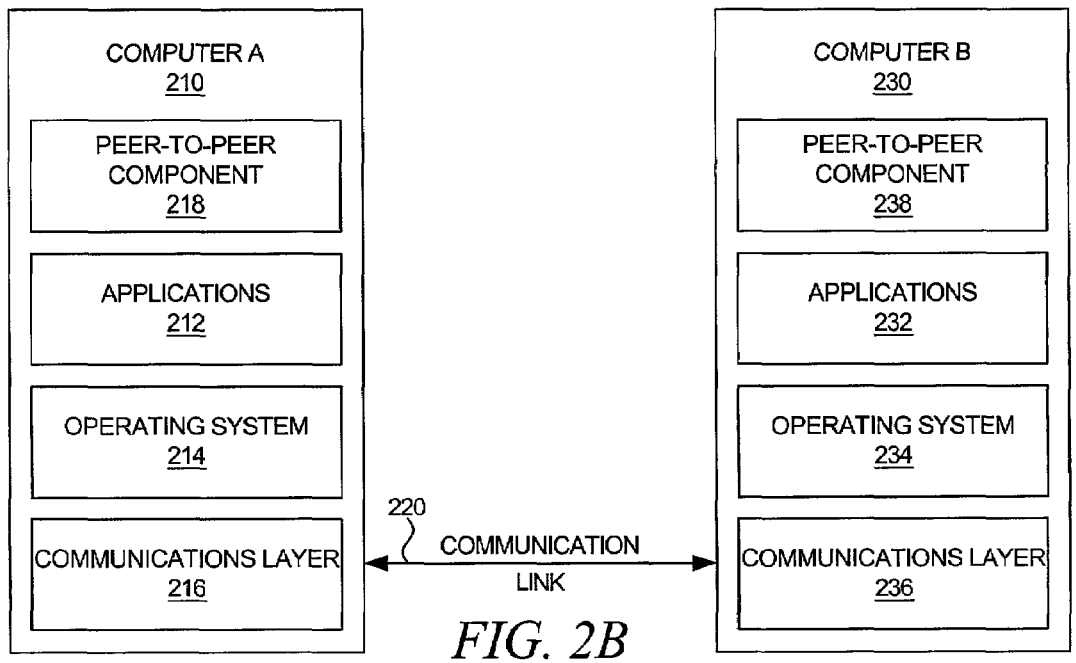
FIG. 2B is a block diagram that depicts software components within two computers that are operating as nodes within a peer-to-peer network.

With reference now to FIG. 2B, a block diagram depicts software components within two computers that are operating as nodes within a peer-to-peer network. Computer 210 has network-enabled applications 212 that use operating system 214 for various services, such as network communication services provided by communications layer 216. In addition, peer-to-peer component 218 may be a stand-alone applet or an application that provides peer-to-peer networking functionality to computer 210. Communication link 220 supports data traffic between computer 210 and computer 230, which has software components that correspond to those shown in computer 210: applications 232, operating system 234, communications layer 236, and peer-to-peer component 238. Peer-to-peer components 218 and 238 may provide support for a distributed, peer-to-peer file sharing function, as shown in more detail in FIG. 2C.

Figure 2C:
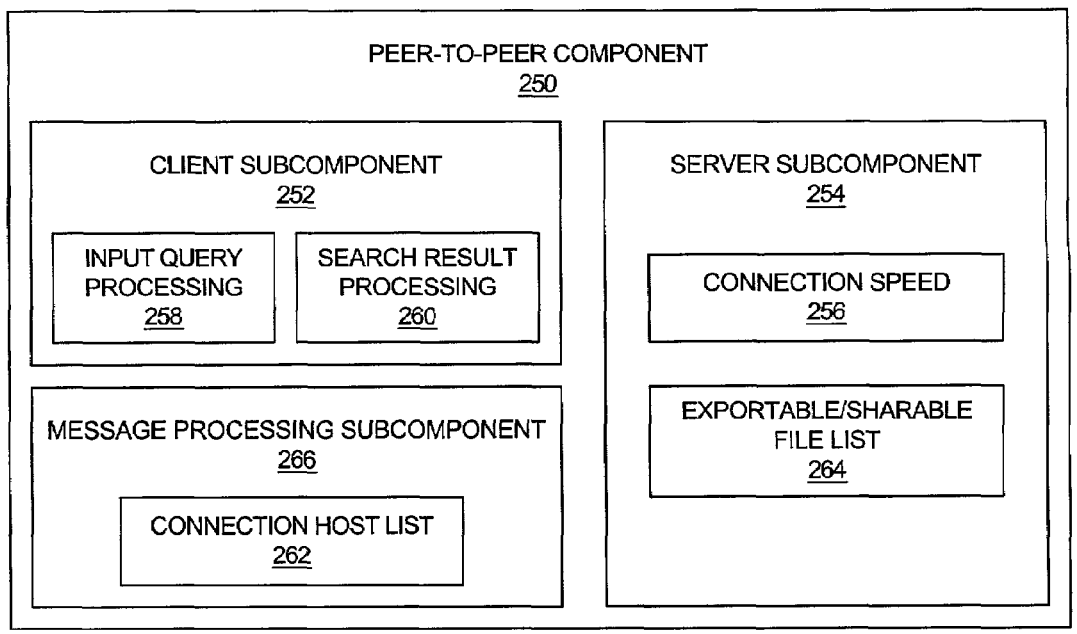
FIG. 2C is a block diagram depicting typical software subcomponents within a peer-to-peer software component that contains file sharing functionality.

With reference now to FIG. 2C, a block diagram depicts typical software subcomponents within a peer-to-peer software component that contains file sharing functionality. As noted previously, in peer-to-peer networks, each computer platform, or node, can operate as a hub, i.e., each node has both client functionality and server functionality. Peer-to-peer component 250 contains client subcomponent 252 and server subcomponent 254.

The method by which nodes in a peer-to-peer network connect with each other may vary with the type of peer-to-peer network. Generally, a client is dynamically assigned an IP address by an ISP when the client connects to the ISP, so the IP address possibly changes with each client session. In some implementations, a peer-to-peer connection between nodes in a peer-to-peer network is initiated when a user at a node manually enters either a domain name or an IP address (and optionally a port number) associated with an application on another node that is known to support peer-to-peer networking. The peer-to-peer application then establishes a connection with the other node at the specified address as a starting point within the network. For example, applications using the Gnutella protocol operate in this manner. Gnutella nodes also exchange connection speed, such as connection speed 256, that describe the speed of the network connection that is being used by the node. It should be noted, however, that the present invention can be implemented on a variety of peer-to-peer networks and is not limited by the peer-to-peer protocol that is used by the file sharing applications.

Nodes within a peer-to-peer network can act as a distributed file sharing system in which the nodes act cooperatively to form a distributed search engine. Client subcomponent 252 contains input query processing function 258 and search result processing function 260. When a user at a node enters a search query, the search query is copied to a list of peer nodes to which the node is connected, such as connection host list 262.

When a node receives the query, its server component, such as server component 254, processes the query. Each peer node searches its own databases in an attempt to satisfy the search query. Alternatively, a user has previously specified a list of files that the user is willing to export or share, such as file list 264, and the server subcomponent searches this list to find one or more files that satisfy the search query. As another alternative, rather than searching through a list of file names, the application may search the node's permanent storage for content that matches the search query. Depending on certain parameters within the query message, the node also forwards the query, e.g., by using message processing subcomponent 266, to each node in its list of connected peer nodes. If a resulting query hit is made, then the node returns some form of query results to the peer node that contacted it or to the originating node. In this manner, the search quickly fans out amongst a large number of nodes.

Figure 2D:
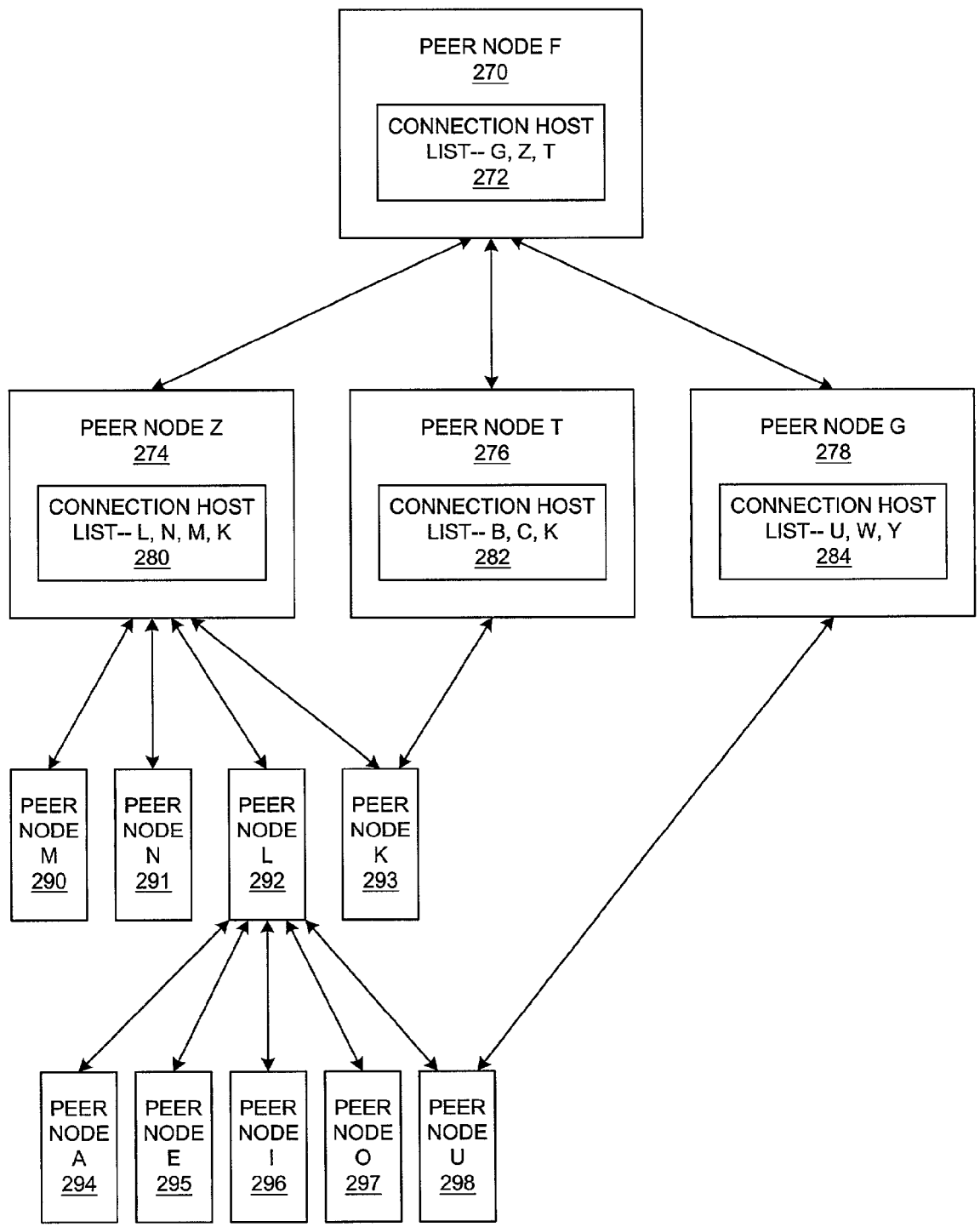
FIG. 2D is a block diagram depicting a typical network topology of nodes within a peer-to-peer network.

With reference now to FIG. 2D, a block diagram depicts a typical network topology of nodes within a peer-to-peer network. Peer node 270 has a connection host list 272 that identifies nodes 274-278 to which peer node 270 is connected, and nodes 274-278 have their own connection host lists 280-284, respectively. In this example, node 274 connects to nodes 290-293, and node 292 connects with nodes 294-298.

It should be noted that peer-to-peer networks do not have a structured topology, such as a strictly hierarchical organization amongst the nodes. In this example, node 276 also connects with node 293, and node 278 also connects with node 298. However, in order to distinguish immediately connected nodes from distant nodes, the set of nodes to which a particular node connects may be termed the "root nodes" of the particular node.

As noted above, the present invention is not limited to any particular peer-to-peer protocol that is used to implement the present invention. As background information, though, the Gnutella protocol is described in more detail as an example of the manner in which information may be passed in a peer-to-peer network between nodes that support a file sharing application. Reference may be made to the above description for FIG. 2C and FIG. 2D for components that would support file sharing within a peer-to-peer network using a protocol similar to Gnutella.

Gnutella is an Internet-based file searching/sharing program that combines both search engine functionality and file server functionality in a single application. When a user enters a search term into a Gnutella-enabled application at a node in the peer-to-peer network, a query message is generated with the appropriately formatted information, and the message is sent as a network packet to the user node's connected peers, i.e., peer nodes with which the user's node has already established a connection or session. Special codes within a Gnutella message header indicate the type of message, and each type of message has a unique code.

Any node within a certain distance from the user's node in the peer-to-peer network, i.e., within a certain node "hop count", will receive the query message; there is no mechanism to kill a query. As a query message moves through the connected nodes, a time-to-live (TTL) data field, which represents the hop count, is decremented. If the TTL field reaches zero, then the receiving node should not forward the query message, i.e., it should "drop the packet". Otherwise, the receiving node forwards the query message.

Each message contains a Globally Unique Identifier (GUID). When a new message is generated, a new GUID is also generated and placed within the new message. The manner in which the GUID is generated is not specifically specified by the Gnutella standard. When any message is received, the GUID is compared to a list of GUIDs, each of which were stored when its corresponding message was received. If the GUID is in the list, this fact indicates that the receiving node has seen this particular message previously because the GUIDs are supposed to be unique. Hence, if the GUID is in the list, then the node should not forward the received message because the receiving node's peer nodes would have also seen the message, and the packet can be dropped.

In addition, if the receiving node can fulfill the query, then the node creates a query hit (query reply) message and returns it to the node that originated the query message. The query hit message contains the address and port number of the responding node so that the originating node can send a message back to the responding node to retrieve a file if desired. The query hit message also contains the connection speed of the responding node and the number of search hits. For each query hit, the query hit message also contains the name of the file that satisfies the query and the size of that file. Other information may be included, such as length of the data content within the message, etc.

Assuming that the originating node has sufficient communication bandwidth, the results of the search should be received within a relatively short amount of time. The search results are stored or cached as they are received. The Gnutella-enabled application then presents the search results to the user in some fashion, and the user may select, through some type of user interface in the application, a filename that the user desires to retrieve. The application, which has stored the search results that include one or more nodes that responded with a search hit, can download a selected file to the user's node. Simple HTTP messages can be used for the download operation, such as a "Get", a "Put" message (for a Gnutella "Push" request.

The Gnutella protocol operates without a central server. Unlike typical search engines, Gnutella searches anonymously, and there is no index. There is also no authentication process nor authorization process. There are other types of messages within the Gnutella protocol, such as "Ping" and "Pong", for discovering other nodes on the network and for responding to "Ping" messages. Additionally, a "Push" request message allows a node within the network but behind a firewall to be contacted to push a file to the outside of the firewall rather than attempting to pull the file from inside the firewall. It should be noted that the Gnutella protocol specification is an open standard and is subject to modifications over time.

Figures 3, 4:
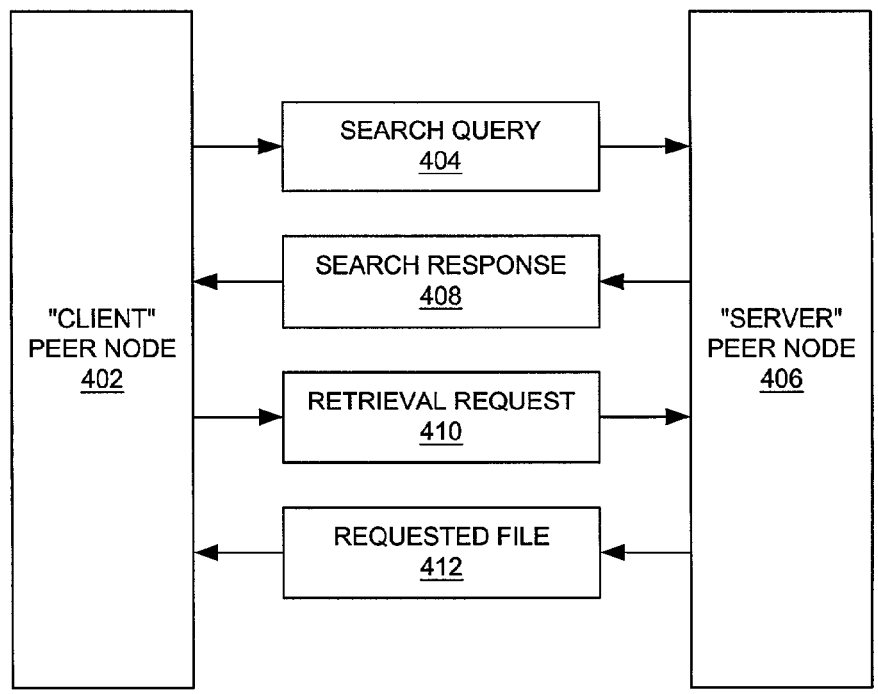
FIG. 3 depicts a GUI window showing general status information for a typical peer-to-peer data sharing application.
FIG. 4 depicts a block diagram showing the manner in which a peer node typically obtains search results and files in a peer-to-peer network.

With reference now to FIG. 3, a GUI window showing general status information for a typical peer-to-peer data sharing application is shown. Window 300 shows information about the operations of a typical peer-to-peer data sharing application that is executing on a given node/host, which may be termed the "source node". "Host" column 302 shows the addresses of connected nodes/hosts. "Type" column 304 shows whether the connection is an incoming connection or an outgoing connection. At a given node, an incoming connection is a connection that was established by the request of another node; in this case, the given node acts as a server to the other node. An outgoing connection is a connection that was established by the request of the given node; in this case, the given node acts as a client to the other node.

"Info Sent/Recv" column 306 shows the current status of the associated connection, such as whether the connection is idle and merely connected or whether the connection is actively sending or receiving data. "Socket" column 308 shows which socket is being used for the associated connection.

Buttons 310-316 allow a user to view statistical information about the operation of the peer-to-peer data sharing application. User selection of "Connections" button 310 would show a log of the connections that have been made; the connection log might show merely the connections that have been made during the current session or all of the connections that have been made since the connection log was initialized or last cleared. User selection of "Searches" button 312 would show a log of previous searches with information such as the success of the searches, the hosts that had hits for the searches, etc. User selection of "Uploads" button 314 would show a log of the data that has been shared with the source node by retrieving the data from another node/host. User selection of "Downloads" button 316 would show a log of the data that the source node has shared by sending the data to another node/host.

Buttons 318-322 allow a user to initiate an operation. User selection of "Remove" button 318 would allow a user to terminate a currently active connection. User selection of "Add" button 320 would allow a user to attempt to create a new active connection. User selection of "New Search" button 322 would allow a user to enter a new query and initiate a search through the peer-to-peer network.

Other information associated with the operation of the peer-to-peer data sharing application could be shown in window 300: the number of peer-to-peer messages that have been processed; the number of searches on the source node; the number of routing errors; the number of dropped messages; the number of bytes that have been uploaded or downloaded; and any other information concerning the previous or current operations of the application.

With reference now to FIG. 4, a block diagram depicts the manner in which a peer node typically obtains search results and files in a peer-to-peer network. Peer node 402, acting as a "client" or search originating host within a peer-to-peer network, generates and sends search query 404 to its list of connection hosts in an attempt to find some type of content. At some point, peer node 406, acting as a "server" or search receiving host within a peer-to-peer network, receives search query 404; peer node 406 may or may not be one of the nodes in the connection host list at the client node as the search query may have been forwarded from another node. In response to finding some type of content or file that satisfies the search query, peer node 406 generates search result 408 that is returned to peer node 402. In response to selecting a query hit in the search results from peer node 406, peer node 402 sends a retrieval request 410 to peer node 406, which then returns requested file 412.

As noted previously, a major issue with respect to downloading files in a peer-to-peer network is the quality-of-service characteristics of the nodes in the peer-to-peer network. A user of a peer-to-peer application has no information with respect to quality-of-service characteristics that may be encountered while downloading a file from a particular node. Prior to selecting a file within a peer-to-peer application and thereby generating retrieval request 410 to peer node 406, a user cannot judge whether requested file 412 will be returned quickly or slowly. Peer node 406 may be experiencing a heavy load with many simultaneous upload and download operations. However, any peer node has only a limited number of connections that it can reasonably support at any given time, and different users may have different opinions as to acceptable download times. Hence, after requesting to download a file from peer node 406, the user may determine that the download of the file proceeds more slowly than desired.

The present invention recognizes that response characteristics may be improved within a peer-to-peer data sharing network. Rather than requiring the user to wait for the completion of the download of a requested file from a selected source node, i.e. a peer node that is acting as a server with respect to a selected file, a source node that implements the present invention can return a redirection response to the requesting node instead of the requested file. If the source node can determine that its response characteristics would be inadequate if it attempted to fulfill a new download request, the source node can inform the requesting node of an alternate peer node from which the user may be able to download the requested file. The generation of a redirection response is explained in more detail with respect to the remaining figures.

Figure 5:
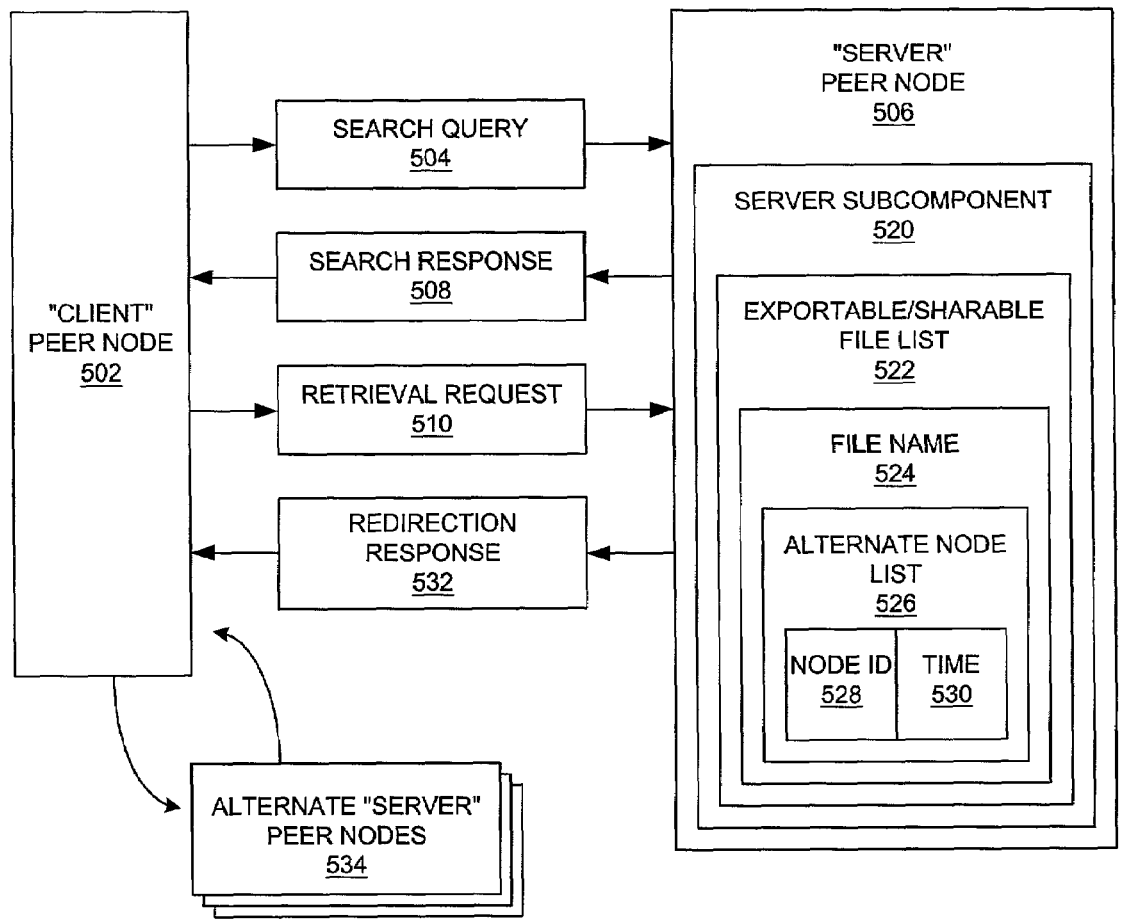
FIG. 5 depicts a block diagram showing the manner in which a peer node can obtain a selected file through a redirection operation in accordance with the present invention.

With reference now to FIG. 5, a block diagram depicts the manner in which a peer node can obtain a selected file through a redirection operation in accordance with the present invention. Peer node 502, acting as a client peer or a search originating host within a peer-to-peer network, generates and sends search query 504 to its list of connection hosts in an attempt to find some type of content. At some point, peer node 506, acting as a server peer or a search receiving host within a peer-to-peer network, receives search query 504. In response to finding some type of content or file that satisfies the search query, peer node 506 generates search result 508 that is returned to peer node 502. In response to a user at peer node 502 selecting a query hit in the search results from peer node 506, peer node 502 sends a retrieval request 510 to peer node 506. Up to this point, the operation of the peer-to-peer network as depicted in FIG. 4 and in FIG. 5 is similar.

As shown in FIG. 2C, file list 264 merely had an identifier for each file name that the peer node was able to share or that the user of the peer node was willing to share. However, FIG. 5 shows that peer node 506 has server component 520 that processes additional information with respect to each file name in its exportable/sharable file list 522. Each file name 524 is associated with alternate node list 526 that contains a list of peer node identifiers; each peer node 528 within alternate node list 526 is associated with a timestamp 530.

With the present invention, when file list 522 is initially generated, the peer-to-peer application, possibly with input from a user, contains the list of files that peer node 506 will share. Since each of the file names in the initial list is stored on peer node 506, the identifier for peer node 506 may be stored with each file name 524 in its respective alternate node list 526.

In a manner similar to that described with respect to FIG. 2C, the initial file list contains a list of the files that peer node 506 can share, but in contrast to file list 264 in FIG. 2C, file list 522 gathers additional information with respect to each file name within file list 522. When peer node 506 shares or uploads a copy of a file to another peer node, the peer-to-peer application on peer node 506 also records an identifier 528, such as an IP address, of the peer node that obtained the copy of the file; for example, identifier 528 would be stored in alternate node list 526 that is associated with the file that was uploaded. Over time, as the file is uploaded multiple times, the alternate node list increases in size with additional node identifiers 528.

When peer node 506 downloads a file, the user may indicate that the newly acquired file is available to be shared or exported to other peer nodes; alternatively, each downloaded file might be automatically sharable, or the peer-to-peer application may apply a "share filter" to the downloaded file to determine whether the file matches a set of criteria that was specified by the user to be applied in determining which files are sharable. In any case, for some of the newly downloaded files, the file name of a newly downloaded file will be added to file list 522.

When a new file is added to file list 522, the alternate node list associated with the new file needs to be generated. Because a newly downloaded file is available from peer node 506, peer node 506 may place its node identifier in the new file's alternate node list to indicate that the file is available from peer node 506; alternatively, any occurrence of a file name within file list 522 may be interpreted as having a default condition in which the file is available from peer node 506. More importantly, though, the node identifier of the peer node from which a newly downloaded file was obtained is added to the alternate node list associated with the newly downloaded file. Hence, each time a newly downloaded file is added to file list 522, its originating source node is recorded.

Over time, alternate node list 526 provides peer node 506 with a record of the original peer node from which a file was obtained (if available) and also a record of the destination peer nodes to which a file was copied. The present invention then uses this recorded information to improve the response characteristics of peer node 506. As mentioned previously, using well-known monitoring techniques for gauging the computational load on a computer or the communication bandwidth load on a network to which the computer is connected, the source node can determine that its response characteristics would be inadequate if it attempted to fulfill a new download request.

Rather than provide poor service by performing a slow upload operation, a peer node that implements the present invention can return redirection response 532 to the requesting node instead of the requested file. Using the information recorded in alternate node list 526 that is associated with each file name 524, when peer node 506 receives a request to upload a file and determines that it is not going to fulfill the request, peer node 506 can return an indication of alternate peer nodes 534 from which requesting peer node 502 can attempt to obtain the file. Peer node 506 may simply copy alternate node list 526 or a portion of alternate node list 526 and return the information as response content within a message.

If the entire alternate node list is returned, the requesting node inadvertently receives a form of history file for the activities of peer node 506. Hence, in some implementations, the peer-to-peer application on peer node 506 may pre-process the information from the alternate node list to generate a subset of alternate nodes in order to mask the activities of the peer-to-peer application on peer node 506. Alternatively, only a single alternate node may be returned to the requesting peer node when available.

In any case, the peer-to-peer protocol may be modified so that the responding node has the ability to indicate that the response is a redirection response and not a fulfillment of the request for the file. As mentioned previously, special codes within a peer-to-peer message header indicate a type of the message, and each type of message has a unique code. With the present invention, a new message code may be added to the protocol to indicate that the response is a redirection response.

In one embodiment, with respect to the protocol being used by the peer-to-peer network, the present invention may use messages that have headers with a unique function ID for a redirected response message. Alternatively, the content or information in a redirection response may be placed within a Gnutella-like "Pong" message, which would require changing the specification of a "Pong" message. Given the potential size of the alternate node list in the redirection information, it may be more efficient to create separate function IDs.

After receiving the indication of the alternate nodes, the requesting peer node 502 may react in a variety of alternative manners. For example, peer node 502 may ignore the information and simply regard the download operation as having failed. Alternatively, peer node 502 may store the redirection information in association with the requested file name such that the user of a peer-to-peer application on peer node 502 can review the information; the user may then manually select an alternate node and initiate a download operation with respect to the selected alternate node. As another alternative, the peer-to-peer application on peer node 502 may process the redirection information as if the list of alternate nodes were query hits in response to a search query; the alternate nodes could then be listed along with other query hits within a GUI window. As yet another alternative, the peer-to-peer application on peer node 502 may automatically try to download the requested file from each of the alternate nodes in sequence until the requested file is successfully retrieved.

In any case, an identifier of an alternate peer node as provided by peer node 506 to peer node 502 would eventually be used in an attempt to obtain the desired file. In this manner, the original request is "redirected" to the alternate node. When peer node 506 receives a request for a file from peer node 502, peer node 506 may determine that it cannot or should not fulfill the request based on a variety of operational conditions at peer node 506. Rather than return an error message or not respond, peer node 506 attempts to "redirect" the request from peer node 502 to one or more alternate peer nodes as derived from the alternate node list that peer node 506 maintains in association with the file name that was requested.

As mentioned previously, in coordination with the peer node identifiers that are maintained within the alternate node list that is associated with each file name in the exportable/sharable file list, each peer node identifier 528 may have an optional, associated timestamp 530. The timestamp is recorded when the node identifier entry is created. For the set of original files on peer node 506, timestamp 530 may be initially set to zero or some special value to indicate that the timestamp value is not particularly relevant to the associated node identifier, i.e. peer node 506.

Assuming that the node identifier entry in the alternate node list was created when the associated file was copied to another peer node, thereby establishing the other peer node as an alternate source for the file, then the time that the alternate node received a copy of a specific file may be kept as additional information that indicates the "freshness" of the copy of the file at the alternate peer node. Given the decentralized nature of the peer-to-peer network, peer node 506 cannot guarantee that the alternate node has maintained a copy of the file since the time that it received the copy. Hence, the age of a timestamp may be assumed to be indirectly proportional to the probability that the alternate peer node has maintained a copy of the file. A recent or "fresh" timestamp can indicate that the alternate peer node still has a copy of the file, while an old or "stale" timestamp can be interpreted as indicating that the alternate peer node may no longer have a copy of the file.

If peer node 506 pre-processes alternate node list 524 prior to sending a redirection response to peer node 502, then the timestamp information may be used by peer node 506 to filter out stale peer nodes. In this case, the threshold for determining the staleness of an alternate peer node could be set as a configuration parameter within the peer-to-peer application on peer node 506.

Alternatively, whether or not peer node 506 pre-processes alternate node list 524, peer node 506 may send timestamps 530 along with alternate peer node identifiers 528 in the content of the redirection response. After peer node 502 receives the redirection response, then the peer-to-peer application on peer node 502 may perform its own interpretation on the timestamp values. In that case, the threshold for determining the staleness of an alternate peer node could be set as a configuration parameter within the peer-to-peer application on peer node 502. As another alternative, the peer-to-peer application on peer node 502 may sort the timestamps and then attempt a sequence of alternate requests in accordance with the order of the most recent timestamps.

It should be noted that other information in addition to timestamps could be associated with each node identifier in the alternate node list, and the above itemization of data items within the alternate node list should not be interpreted as being an exclusive or exhaustive list. Moreover, each alternate node list may be partially or fully flushed or reset periodically or based on a determined condition such that an alternate node list does not increase in size without bounds; the threshold for determining when an alternate node list is flushed or reset may also be specified through a user-configurable parameter.

Figure 6:
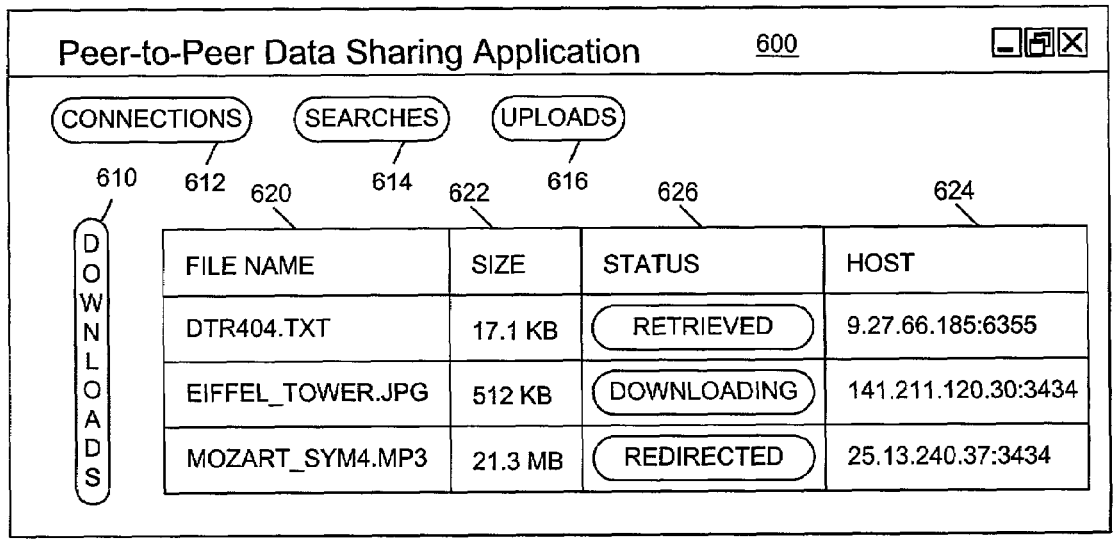
FIG. 6 depicts a GUI window showing status information for a peer-to-peer data sharing application in accordance with a preferred embodiment of the present invention.

With reference now to FIG. 6, a GUI window shows status information for a peer-to-peer data sharing application in accordance with a preferred embodiment of the present invention. As noted above, depending on the protocol used in the peer-to-peer network, a query hit message typically contains the size of a file associated with a particular name of a file that satisfies the search query. Window 600 shows information about some of the download operations within a peer-to-peer data sharing application that is executing on a node that can be viewed as being operated as a client.

In a manner similar to that described above for FIG. 3, buttons 610-616 allow a user to view statistical information about the operation of the peer-to-peer data sharing application. Selecting "Downloads" button 610 would show a list of the download operations that have occurred within a certain time period, and selecting "Connections" button 612 would show a log of the connections that have been made. Selecting "Searches" button 614 would show a log of previous searches, and selecting "Uploads" button 616 would show a log of the data that has been shared with the source node by retrieving the data from another node/host.

Using a table format, a list of files and their download status are shown in window 600. "File Name" column 620 shows the names of the files that the user has selected to download. "Size" column 622 shows the associated size of the files that are shown in column 620. "Host" column 624 shows the address of a connected peer node/host for a particular download operation.

"Status" column 626 shows the current status of the associated download operation, such as whether the download operation has been initiated or has been completed. The reported status is shown in the form of a button that the user may select in order to see statistics associated with the respective download operation and to select processing or configuration options to be applied to the download operation.

In accordance with the present invention, a peer-to-peer application that implements the present invention can receive redirection responses from a peer node that has not fulfilled a download request for a file. If a redirect response is received, this can be reflected in the status window, as shown in FIG. 6, so that the user may subsequently request an appropriate action with respect to the redirected request, as explained above with respect to FIG. 5, e.g., initiating a sequence of download requests to the supplied alternate peer nodes.

Figure 7A:
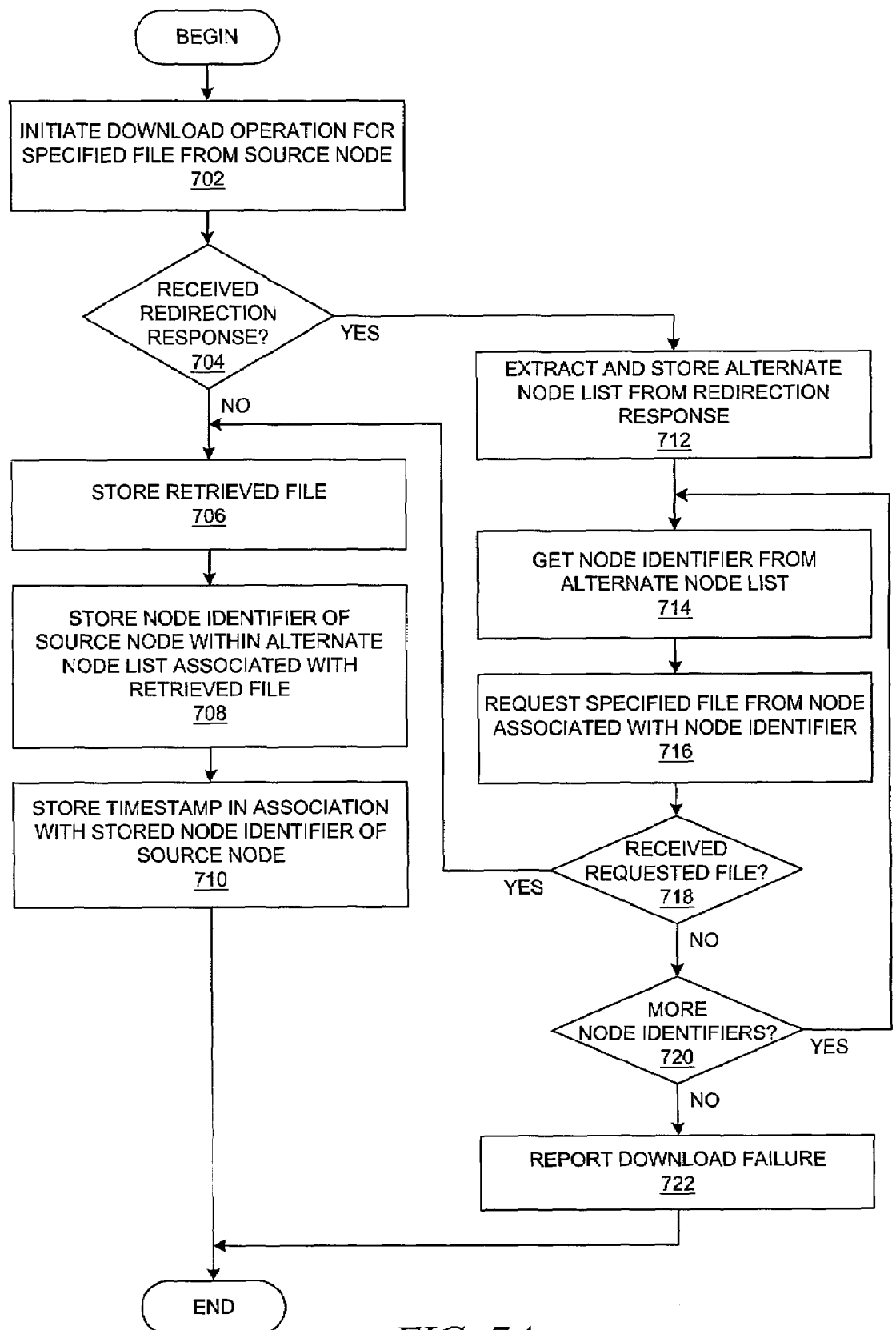
FIG. 7A depicts a flowchart showing a process for maintaining an alternate node list with respect to client-side peer node operations within a peer-to-peer data sharing application in accordance with the present invention.

With reference now to FIG. 7A, a flowchart depicts a process for maintaining an alternate node list with respect to client-side peer node operations within a peer-to-peer data sharing application in accordance with the present invention. The process begins when a peer-to-peer data sharing application at a peer node that is operating in a client mode initiates a download operation by sending a download request for a specified file to a source node (step 702). The source node may be a peer node that has positively responded to a previous search query from the client node, or the node identifier for the source node may have been received by the client node in an alternate node list within a redirection response.

After some period of time, the client node receives a response and checks whether it has received a redirection response (step 704). If not, it may be assumed for simplicity of presentation that the client node has received the requested file, and the client node stores the retrieved file (step 706). Since the client node knows that the source node has a copy of the file that was requested and received, the client node stores the node identifier of the source node within an alternate node list associated with the retrieved file (step 708). Optionally, the client node also stores a timestamp in association with the stored node identifier of the source node (step 710), and the process is complete.

However, if the client node has received a redirection response, then the client node extracts and stores the alternate node list from the redirection response (step 712). The client node may then process the alternate node list in a variety of ways, as described above with respect to FIG. 5, including automatically trying to retrieve the requested file from one of the alternate nodes.

A processing loop can be entered in which the client node extracts a node identifier from the alternate node list (step 714). The client node requests the file from the peer node that is identified by the extracted node identifier (step 716). A determination is then made as to whether or not the client node has received the requested file (step 718), and if so, then the process branches back to step 706 to process the file. If the requested file has not been received, then a determination is made as to whether or not there is another node identifier within the alternate node list (step 720). If so, then the process branches back to step 714 to retry a download operation in an attempt to retrieve the file. If all of the alternate nodes have been tried, then the process may report a download error (step 722), and the process is complete.

Figure 7B:
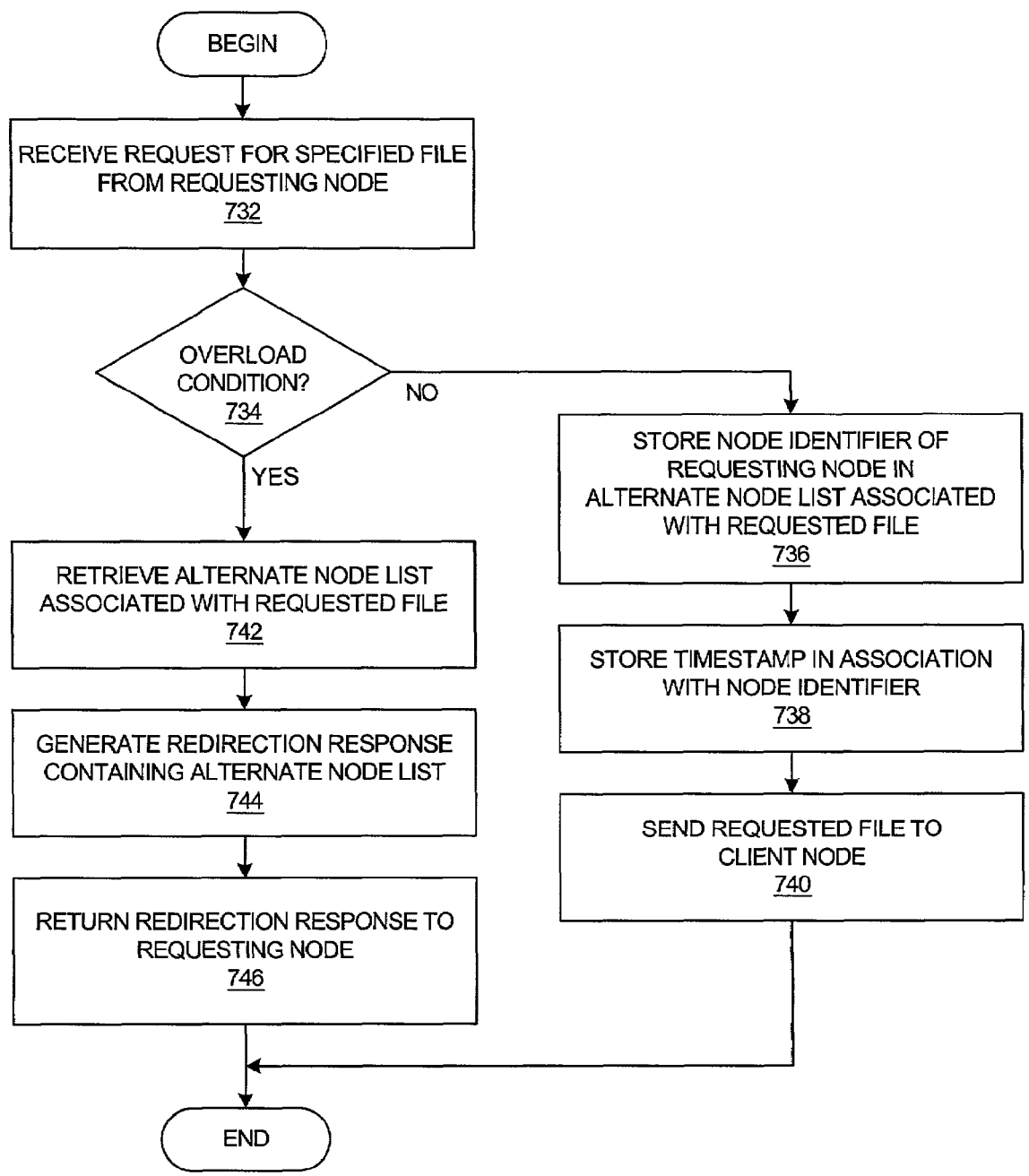
FIG. 7B depicts a flowchart showing a process for maintaining an alternate node list with respect to source-side peer node operations within a peer-to-peer data sharing application in accordance with the present invention.

With reference now to FIG. 7B, a flowchart depicts a process for maintaining an alternate node list with respect to source-side peer node operations within a peer-to-peer data sharing application in accordance with the present invention. It should be noted that the client-side peer node functionality that is depicted in FIG. 7A and the server-side peer node functionality that is depicted in FIG. 7B may be present within the same peer-to-peer data sharing application.

The process begins when a peer-to-peer data sharing application at a peer node that is operating in a server mode receives a download request for a specified file from a client node (step 732). As noted above, a peer node can be viewed as a source node with respect to a particular file when the peer node is able to act as a source of a copy of the particular file.

A determination is then made as to whether the source node is in an overload condition (step 734). The overload condition may already be existence with a set of current uploading and downloading operations, or the overload condition could be predicted to occur if the download request were to be fulfilled. In either case, if there is no overload condition, then the source node knows that the peer node that will be receiving the requested file can subsequently act as an alternate source for that particular file. Hence, the source node stores the node identifier of the requesting peer node in the alternate node list associated with the requested file (step 736). Optionally, the source node also stores a timestamp in association with the stored node identifier of the requesting peer node (step 738). The requested file is then uploaded to the peer node that submitted the download request (step 740), and the process is complete.

If it is determined that an overload condition is in effect or about to occur, then the source node determines not to fulfill the download request for the specified file. Instead, the source node retrieves the alternate node list that is associated with the requested file (step 742) and generates a redirection response containing the retrieved alternate node list (step 744). The source node then returns the redirection response to the requesting peer node, i.e. client node (step 746), and the process is complete.

The advantages of the present invention should be apparent in view of the detailed description of the invention that is provided above. In the prior art, in order for a user to determine whether or not to attempt to download a file from a peer node within a peer-to-peer network, the user must rely on the connection speed information that accompanies a query hit message after a search query has been accomplished. After initiating a download operation, the download operation must be monitored in order to determine whether or not the source node is overloaded.

In contrast, the present invention allows a peer node to respond to a download request with a redirection response that contains a list of node identifiers for alternate nodes that may also have a copy of the requested file. In this manner, a peer node can provide a helpful response to a download request without becoming further overloaded by attempting to fulfill the download request, which would consume additional connection bandwidth, etc., from the source peer node.

Moreover, the quality-of-service characteristics of the nodes in the peer-to-peer network is a major factor in the consideration as to whether or not to rely on a peer-to-peer network for content distribution purposes. With the present invention, peer nodes can distribute additional information about potential sources of files such that the download burden on a given set of peer nodes is relieved and distributed among many peer nodes in an ad-hoc manner.

Typically, a user would abort a download attempt if the user determines that the download attempt is unsatisfactorily slow after the download has already been started. With the present invention, the number of aborted download operations is significantly reduced, thereby reducing the amount of wasted computational resources at a peer node that may have partially uploaded a requested file before the operation was aborted. While there is no guarantee that the requested file can be found at the alternate peer node or that the alternate peer node can quickly download the file from an alternate peer node, the requesting peer node at least has a starting point for continuing the search for a copy of a desired file.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for operating a data sharing application in a peer-to-peer network, wherein nodes within the peer-to-peer network can operate both in a client mode while requesting data in a server mode while transmitting data, the method comprising:

receiving from a first peer node to request for a copy of a specified file at a second peer node; and in response to receiving the request, returning a response message to the first peer node, wherein the response message comprises an alternate node list associated with the specified file, wherein the alternate node list comprises a set of node identifiers indicating a set of alternate peer nodes within the peer-to-peer network that may have a copy of the specified file;

maintaining an uploadable file list at the second peer node, wherein the uploadable file list comprises a set of file identifiers indicating a set of files stored on the second peer node that are available for uploading in response to received requests;

associating an alternate node list with each file in the list of files that are available for uploading;

in response to receiving the request, determining whether or not the second peer node is in an overload condition; and in response to a determination that the second peer node is not in an overload condition, sending a copy of the specified file to the first peer node;

obtaining a node identifier for the first peer node wherein a node identifier is an Internet Protocol (IP) address;

adding the node identifier for the first peer node to the alternate node list associated with the specified file;

in response to receiving the request, determining whether or not the second peer node is in an overload condition;

in response to a determination that the second peer node is in an overload condition, generating the response message;

retrieving a copy of a file from a third peer node;

storing the retrieved file at the second peer node;

obtaining a node identifier for the third peer node;

adding the node identifier for the third peer node to the alternate node list associated with the retrieved file;

associating a timestamp with the node identifier in the alternate node list associated with the retrieved file to indicate a time value at which the retrieved file was retrieved from the third peer node; and, processing the alternate node list associated with the specified file with respect to a set of timestamps within the alternate node list in order to delete node identifiers associated with timestamps that are older than a configurable threshold value.

* * * * *